July 18, 1961

C. L. HOPKINS

2,992,829

POLYMORPHIC GEOMETRICAL DEVICES

Filed Aug. 9, 1956

Inventor
CHARLES L. HOPKINS by Hill, Sherman, Meroni, Gross & Simpson Attys.

July 18, 1961

C. L. HOPKINS

2,992,829

POLYMORPHIC GEOMETRICAL DEVICES

Filed Aug. 9, 1956

Inventor
CHARLES L. HOPKINS

July 18, 1961 C. L. HOPKINS 2,992,829
POLYMORPHIC GEOMETRICAL DEVICES
Filed Aug. 9, 1956 6 Sheets-Sheet 5

Inventor
CHARLES L. HOPKINS
by Attys.

July 18, 1961 C. L. HOPKINS 2,992,829
POLYMORPHIC GEOMETRICAL DEVICES
Filed Aug. 9, 1956 6 Sheets-Sheet 6

Inventor
CHARLES L. HOPKINS
by Hill, Sherman, Meroni, Gross & Simpson Attys.

United States Patent Office 2,992,829
Patented July 18, 1961

2,992,829
POLYMORPHIC GEOMETRICAL DEVICES
Charles L. Hopkins, Chicago, Ill.
(3173 Strathmore Drive, Ventura, Calif.)
Filed Aug. 9, 1956, Ser. No. 603,062
9 Claims. (Cl. 273—157)

The present invention relates to an improved arrangement of hingedly connected members affording novel polymorphic geometrical devices.

The use of individual block units adapted to be assembled to provide various geometrical forms has, of course, been long known. However, except in relatively small numbers and in simple rectangular shapes, the combination and manipulation of unconnected, discrete blocks present difficulties and inconveniences; for example, only a limited number can be controlled simultaneously; some blocks may be accidentally dislodged from their desired positions while others are being combined; and individual blocks necessary to satisfactory use of a set may become lost. Thus, the possibilities of producing a wide range of desired arrangements of discrete blocks of nonrectangular shapes in composite geometrical solids are seriously limited. Furthermore, it is sometimes desirable—though relatively impossible with discrete blocks—to impart predetermined symmetry to a group of blocks and to predetermine the range and types of possible configurations.

It is to the solving of these problems and more particularly to the attainment of the latter objectives that the instant invention has been addressed.

It is, accordingly, an important object of the present invention to provide new and improved polymorphic geometrical devices in which blocks of predetermined geometrical shapes are connected together in hinged fashion so as to be readily manipulable in the manner desired.

Another object of the invention is to provide novel hingedly connected series arrangements of blocks having the property of being interconvertible into a large number of distinct geometrical shapes as a result of the rotation of the individual blocks about their hinges, thus selectively combining them by a variety of juxtaposition and superpositions.

A further object of the invention is to provide devices comprising hingedly connected members having the property of being rearrangeable into many different geometrical shapes successively without losing the integrity of the devices as a whole.

Still another object of the invention is to provide polymorphic geometrical devices comprising a number of unit shapes flexibly joined in predetermined serial order, the kind and system of joining and the number and shape of the units in conjunction with the serial order determining the forms and number of distinct geometrical shapes into which the devices may be intraconverted.

Yet another object of the invention is to provide improved polymorphic geometrical devices comprising articulated ring-form series which may be rotated as to turn certain inwardly directed faces of the blocks outward, and vice versa, such rotation causing the individual blocks to spring in and out of their positions in a lifelike manner at the same time that various geometrical juxtapositions of the blocks are being attained.

The attainment of these and other objects, as well as various features and advantages of the present invention, will be readily apparent from the following descriptions of a number of illustrative embodiments thereof, taken in conjunction with the accompanying somewhat diagrammatic drawings, in which.

In the attainment of the several objectives of the present invention, assemblies of blocks are hingedly connected together in predetermined manner. Such blocks may comprise any preferred material or combination of materials, in solid form, hollow form, or even merely open framework form. In any event, each of the block units is provided with a predetermined geometrical arrangement of faces. By the term "block" or "block unit," therefore, is meant a three-dimensional, geometrical member presenting a plurality of surfaces or faces. All of the blocks are serially articulated by some sort of hinge means, and it should be understood herein that the term "hinge" in any of its forms means the articulated connection of the edges of any two or more serially adjacent blocks to swing about predetermined axes.

Further, in the attainment of the principles of the present invention, the several assemblies of serially articulated blocks have their hinges lying in at least two non-parallel sets of axes of rotation. Even where there are only two such sets of hinge axes in a series of the blocks, manipulative force applied to the series is communicated along the series to rotate the blocks in varying degrees, and in various directions, so that the axes of hinging are variously distorted, with the result that the range of movements relative to each other of any two of the block units several hinges apart in the assembly is quite large.

Although the serially articulated blocks tend to follow certain symmetrical patterns of movement within relatively wide limits when manipulative force is applied to them, an interesting effect of "liveness" in the assembly is experienced incident to manipulation.

The possibilities of combination of the blocks in any one assembly are, though large, intentionally held within reasonable limits, the various possibilities being dependent on such factors as the shapes of the blocks, the number of blocks, the serial order of the blocks, the plane-angular relationships of the faces of serially adjacent blocks, the dihedral-angular relationships of the edges selected for articulation, etc. The limitations thus imposed on the possibilities of combination are definitely desirable in arrangements of these hinged blocks intended for puzzles since they provide the manipulator with obstacles which his ingenuity must overcome before he can achieve the objectives of the puzzles. Moreover, such an arrangement intended as a puzzle affords the advantage of combining in a single integrated toy several puzzles of several distinct types, each type requiring the attainment of a different kind of objective. One such kind of objective is the construction by appropriate manipulation of a prescribed composite geometrical solid. Another kind of objective is the construction of a geometrical solid having a prescribed color or pattern of colors visible. A third kind of objective is the construction of one or another geometrical solid with opaque, composite, plane faces exhibiting properly arranged picture puzzles or other properly arranged indicia which may be either flat or in relief. With enough blocks in a series, a single assembly can provide a considerable number of different picture puzzles. If at least some of the blocks in the assembly are made of transparent materials, some of the picture puzzles to be achieved may be three-dimensional ones, the fragments of the objects in the pictures being distributed on various transparent and opaque surfaces or placed in the interiors of the blocks. Suitable manipulation of the blocks in such an assembly forms composite geometrical solids whose external and internal composite faces or whose interiors exhibit parts of a picture variously located in three-dimensional space, each part of the picture becoming recognized when assembled through both superposition and juxtaposition of the faces which bear or of the blocks which contain supplementary picture fragments.

Besides use for puzzles or manipulative toys of wide variety, the present invention affords adaptability for many items such as decorative novelties for personal adornment such as belts, necklaces, crowns or other types of jewelry. Spinning tops and novelty containers may also be provided, having changeable characteristics. Devices for psychological testing may be provided. Educational devices for demonstrating the mathematical relations of various geometrical plane and solid figures are practicable arrangements. The invention may also be adapted to educational devices for training children in muscular coordination or for muscular re-training of handicapped persons, or for training children in reading, spelling, use of numbers, and in important serial orders such as alphabetical order and numerical order.

Figure 1:
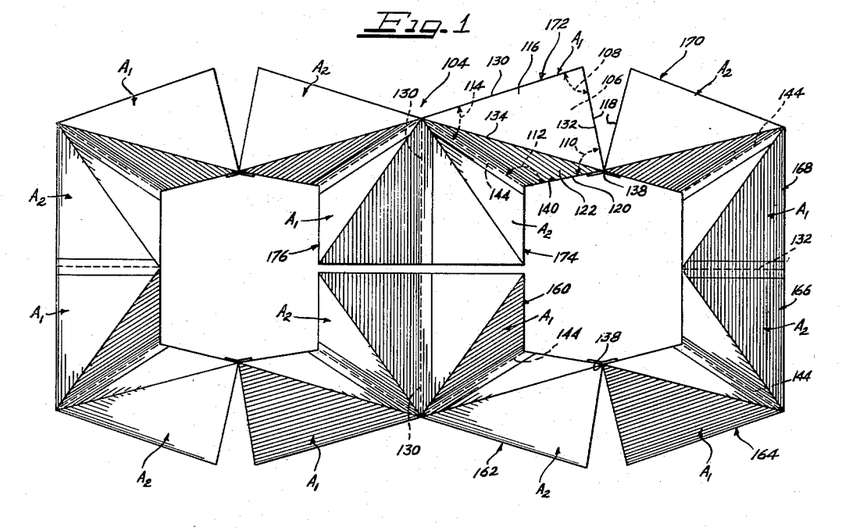
FIGURES 1, 2 and 3 are plan views showing different exemplary formations which may be effected by hingedly connected series of block units, according to one embodiment of the present invention.
Figure 2:
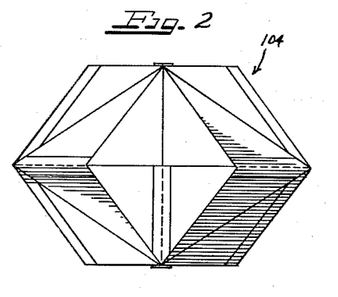
Figure 3:
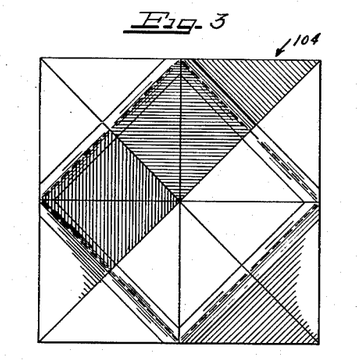

FIGURES 1 through 5 illustrate but a few of the many formations obtainable by proper manipulation of a single exemplary ring of blocks. FIGURE 1, which is seen to be of a general configuration similar to the number "8,"

is obtainable by a hingedly connected series of blocks such as is illustrated in FIGURES 5 through 9. The dodecahedron shown in FIGURE 2 is another illustrative formation obtainable from the same series of blocks shown in FIGURE 1. Likewise, the general ashtray-like configuration illustrated in FIGURE 3 is another illustrative formation obtainable from the same series of block units.

Thus, it is seen that one feature of the present invention is the provision of a hingedly connected series of block units which are manipulable into various formations, as for puzzles.

Figures 4, 12, 13, 14, 15, 16:
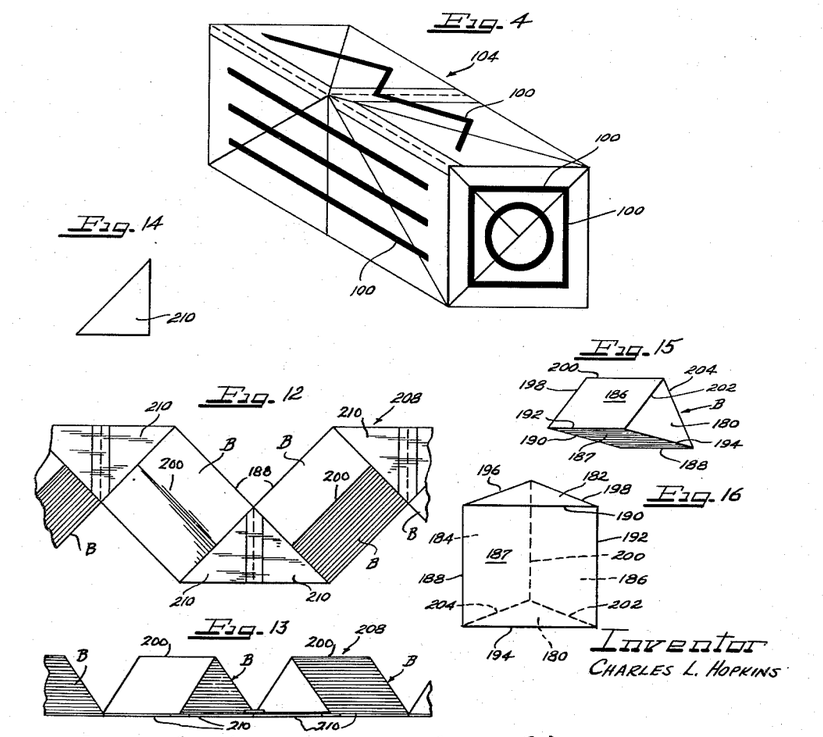
FIGURE 4 is an isometric view illustrating a further formation obtainable by the same series of block units, and also showing an arrangement whereby individual block units carrying fragments of a composite design, pattern, or the like can be manipulated to effect a whole.
FIGURE 12 is a plan view illustrating a fragmental portion of a hinged series of block units and plane panels according to a modified embodiment of the present invention.
FIGURE 13 is a side elevational view of the assembly of FIGURE 12.
FIGURE 14 is an end view of one of the block units shown in FIGURE 12.
FIGURE 15 is an isometric view of one of the block units shown in FIGURES 12 and 13.
FIGURE 16 is an isometric view of the same block, taken from a different viewing point.
Figure 5:
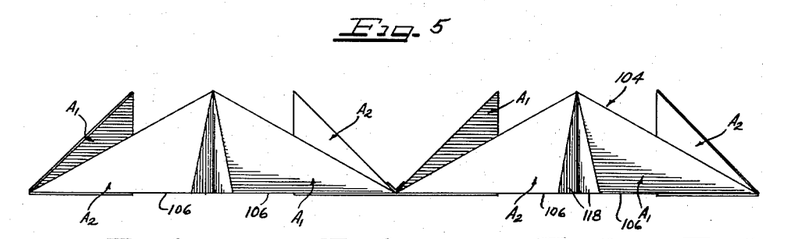
FIGURE 5 is a side elevational view of the formation illustrated in FIGURE 1.

According to another feature of the present invention, as illustrated in FIGURE 4, the various block units may each carry fragmentary portions 100 of a composite pattern, picture, symbol, design, or the like, to provide that when the blocks are manipulated into a predetermined formation the fragmentary portions will form an integrated, composite pattern or design either flat or in relief, or combination of whatever indicia are desired.

Figure 54:
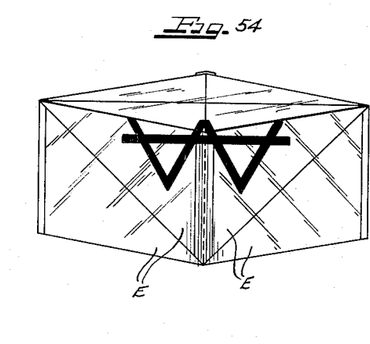
FIGURE 54 is an isometric view of a series of block units hingedly connected in a continuous or closed-ring arrangement manipulated into a compact formation, illustrating block units which are transparent and which have some sort of design or other indicia on several respective faces to provide that when the block units are manipulated or arranged into a preselected composite formation the design portions will visually integrate to provide a composite pattern or picture, the block units here shown as being of the form of the block units illustrated in FIGURES 24 through 29.
Figure 55:
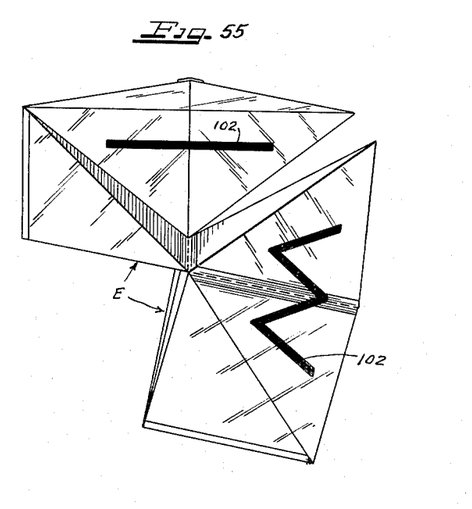
FIGURE 55 is an isometric view showing an intermediate step in the manipulation into the composite geometrical formation and combination of indicia illustrated in FIGURE 54.
Figure 56:
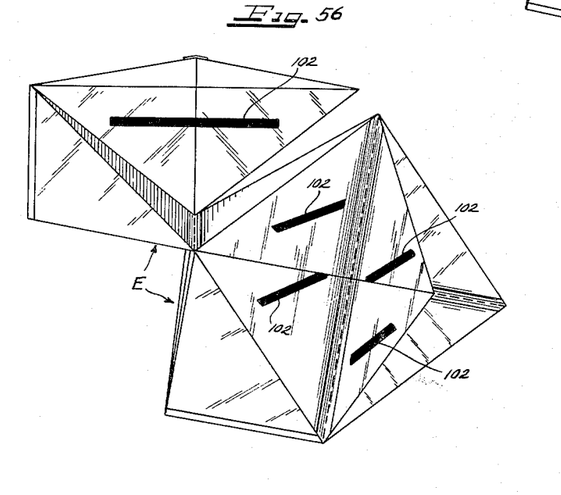
FIGURE 56 is an isometric view illustrating a preceding step in the manipulation into the composite geometrical formation and combination of indicia illustrated in FIGURE 54.

A related feature of the present invention is illustrated in FIGURES 54 through 56. As there shown, the individual block units are transparent and carry design fragments 102 which provide that when the blocks are manipulated into a predetermined formation according to FIGURE 54, they will form a composite pattern which appears on the interior faces of the transparent composite formation.

The drawings illustrate several different exemplary shapes of the individual block units. These shapes, together with various examples of hinging arrangements or patterns will be described hereinafter, it being understood that such shapes and hinging arrangements are merely illustrative of principles and concepts of the invention. Various block shapes may be used, various hinging arrangements may be employed, various composite or hybrid arrangements of blocks may be employed, such as, for example, the utilization of mirror-image blocks, arrangements including block units of different configurations, arrangements including both two-dimensional and three-dimensional geometrical figures, etc.

Turning now to the description of the block units of the illustrated suggested forms, it is seen that in FIGURE 1 the block units forming the ring 104 are enantiomorphic or mirror-image blocks. Since both shapes appearing in the ring 104 are of a corresponding though mirror-image configuration, both shapes are designated by the letter A, and are specifically identified by the reference characters A1 and A2.

A block unit having the shape of a block A1 will now be described, it being understood that the shape of block units A2 differs therefrom by virtue of the fact that blocks A1 and A2 are of mirror-image relationship.

Block or unit A1 (FIGS. 1, 5 and 6) is a pentahedron, or five-faced solid; shown as a quadrangular pyramid having as its base a trapezoid 106 whose angles are, in clockwise order as viewed from above, an angle 108 shown as of 90°, an angle 110 shown as of 90°, an obtuse angle 112 shown as of approximately 125°, and an acute angle 114 shown as of approximately 55°. The four faces of the pyramid, considered in this same clockwise order, are: a large triangle 116, here shown as an isosceles right triangle, one of whose legs coincides with the longest side of the trapezoidal base 106; a smaller triangle 118, here shown as an isosceles right triangle, one of whose legs coincides with that side of the trapezoid included within 90° angles; a scalene right triangle 120 shown as having angles of 90°, approximately 35°, and approximately 55°, and whose shorter leg coincides with that side of the trapezoid included within a 90° angle 110 and the angle 112 of approximately 125°; an isosceles triangle 122 with approximate angles of 110°, 35°, and 35° and one of whose equal sides coincides with that side of the trapezoid included within the angle 114 of approximately 55° and the angle 112 of approximately 125°. The vertex 124 of the pyramid is perpendicularly above that 90° angle 110 of the trapezoid which lies between the other 90° angle 108 and the angle 112 of approximately 125°.

The block unit A2, as stated above, has a symmetric or mirror-image relationship with respect to block unit A1 just described. Thus, the same description as for block unit A1 applies to the other type of block unit A2 if its parts are traced around in the reverse or counterclockwise direction as seen from above.

Block units A1 and A2 are advantageously combined in equal numbers in block series as shown in FIGURES 1 through 5.

Figures 8, 9, 10:
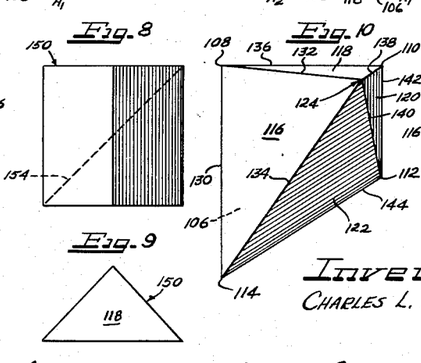
FIGURE 8 is a plan view of a block which may be cut along the plane indicated by the broken line to provide another pair of block units included in the series shown in FIGURE 1, these block units being in enantiomorphic or mirror-image relation to the block units which may be formed in the manner indicated by FIGURE 6.
FIGURE 9 is an end elevational view of the block of FIGURE 8.
FIGURE 10 is an enlarged, perspective view of a block unit of a type included in the series shown in FIGURE 1, and of the type which may be formed according to FIGURE 6.
Figure 11:
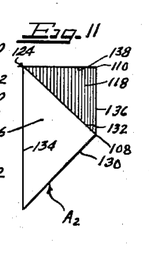
FIGURE 11 is an isometric view of a mirror-image of the block shown in FIGURE 10, on a reduced scale.

For block unit A1, the edges are designated in the drawings (FIGS. 1, 10 and 11) as follows, the block being considered again as resting on the trapezoidal base face 106:

Edge 130: a horizontal base edge, along the 45° dihedral angle, at the intersection of large isosceles right triangle 116 with the base 106;

Edge 132: an edge along the 90° dihedral angle, at the intersection of large isosceles right triangle 116 and the smaller isosceles right triangle 118, being one leg of the larger isosceles right triangle 116 and hypotenuse of the smaller isosceles right triangle 118;

Edge 134: an oblique lateral edge, along the 90° dihedral angle along the hypotenuse of larger isosceles right triangle 116 and the longest side of isosceles triangle 122;

Edge 136: a horizontal base edge along the 90° dihedral angle, on horizontal leg of smaller isosceles right triangle 118 and on that side of base 106 which is included between two 90° angles 108 and 110;

Edge 138: a vertical edge, along the 90° dihedral angle, on vertical leg of smaller isosceles right triangle, and on the longer, vertical leg of scalene right triangle 120;

Edge 140: an oblique edge, along a 120° dihedral angle, on one leg of larger isosceles triangle 122 and on the hypotenuse of scalene triangle 120;

Edge 142: a horizontal base edge, along the 90° dihedral angle, along the shorter leg of scalene right triangle 120 and on that side of base 106 which is included between the 90° angle 110 and the 125° angle 112;

Edge 144: a horizontal base edge, along the 60° dihedral angle, on lower of two equal sides of isosceles triangle 122 and on that side of base 106 included between the 55° angle 114 and the 125° angle 112.

Figure 6:
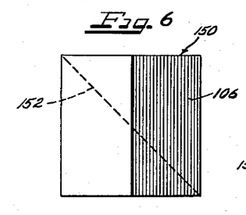
FIGURE 6 is a plan view of a block which when cut along the plane indicated by the broken line will provide a pair of the block units included in the series of the preceding figures.
Figure 7:
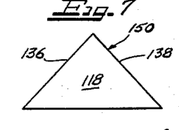
FIGURE 7 is an end elevational view of the block of FIGURE 6.

FIGURES 6 and 7 illustrate a block 150 which may be cut as indicated by broken line 152 to produce a pair of blocks A1. The block 150 is a triangular right prism.

FIGURES 8 and 9 illustrate how the same block 150 may be cut to obtain a pair of blocks A2, but cutting along a line 154 generally opposite to line 152. Other pyramids than A1 and A2, having generally similar angular relations and combining powers in hinged assemblies, may be derived in the same manner as A1 and A2 from other right prisms with greater or lesser altitudes than one equal to the longest side of the prism-base, as is the relation in A1 and A2.

The series 104 of blocks A1 and A2 (FIG. 1) is a continuous or generally closed-ring-form arrangement. The number of individual blocks is desirably sufficient so that the series may be indefinitely rotated about its own longitudinal axis. At least sixteen blocks are preferred, the total number being desirably the product of four and some even number.

In this series 104 (FIG. 1), the blocks are arranged so that alternating ones are mirror-images, that is, the order is A1, A2, A1, A2, etc.

The hinging pattern of series 104, one exemplary arrangement of A units, is as follows, it being noted that each pair of superposable faces joined by any hinge is a congruent pair. For example, beginning with block 160 (an A1 unit), the edges 144 of blocks 160 and 162 are hinged together, uniting two trapezoids and two isosceles triangles. Edges 138 of blocks 162 and 164 are hinged together, uniting two scalene right triangles and two of the isosceles right triangles. Blocks 164 and 166 are hinged together like blocks 160 and 162. Hinging of edges 132 of blocks 166 and 168 together, unites two smaller isosceles right triangles and two larger isosceles right triangles. Hinging of blocks 168 to 170 is effected along edges 144, like blocks 164 to 166. Block 170 is hinged to block 172 along edges 138, like blocks 162 to 164. Block 172 is hinged to 174 like block 160 to 162. This completes one half of the 16-unit bi-symmetrical ring-form assembly 104.

Continuing in ring 104, the other eight blocks in the 16-unit ring correspond in type and in hinging with blocks 160 through 174, each to each. The last block in the first half, 174, is hinged to the first block in the second half, 176, on edges 130, uniting two trapezoids and two larger isosceles right triangles. The last block in the second half of the assembly is hinged to block 160 just as block 174 is hinged to block 176 thus completing the ring so that it has two inversely congruent halves.

One alternative arrangement employing blocks A1 and A2, for example, would be an arrangement where they are employed in double alternating pairs, viz., A1, A1, A2, A2, etc.

A hinging pattern for such an A1, A1, A2, A2, arrangement would be as follows:

The edge 134 of an A1 unit is hinged to edge 134 of another A1 unit, thus uniting a congruent pair of isosceles triangles and a congruent pair of the larger isosceles right triangles. Edge 132 of the latter A1 block is hinged to edge 132 of an A2 block, uniting a congruent pair of the larger isosceles right triangles and a congruent pair of the smaller isosceles right triangles. Edge 134 of this A2 block is hinged to edge 134 of another A2 block uniting a congruent pair of the larger isosceles right triangles and a congruent pair of isosceles triangles. Edge 138 of the latter A2 block is hinged to edge 138 of an A1 block, uniting a congruent pair of the smaller isosceles right triangles and a congruent pair of scalene right triangles. Then additional blocks in another similar group of four are hinged together in the same manner just described, the eight blocks in two groups of four forming one-half of a ring of sixteen blocks. The eight blocks forming the second half of the ring are selected and hinged in the same manner as the first half. The halves are then united to form a bilaterally symmetrical ring, by hinging together edges 142 of the end blocks, uniting a congruent pair of scalene right triangles and a congruent pair of the trapezoidal bases. The closed ring-form series of blocks is seen to be a closed bisymmetrical ring of blocks formed with two inversely congruent halves.

Still another illustrative hinging arrangement employs a series of blocks A1 and A2, arranged by inversely congruent pairs, as follows: Starting with an A1 block, its edge 130 is hinged to edge 130 of an A2 block, uniting a congruent pair of trapezoids and a congruent pair of the larger isosceles right triangles. Edge 140 of the A2 block is hinged to edge 140 of another A1 block, uniting a congruent pair of isosceles triangles and a congruent pair of scalene right triangles. Edge 130 of that A1 block is hinged to edge 130 of another A2 block, uniting the same congruent pairs as when hinging the first block to the second. Edge 138 of the latter A2 block is hinged to edge 138 of another A1 block, uniting a congruent pair of the smaller isosceles right triangles and a congruent pair of scalene right triangles. Each succeeding group of four blocks corresponds to the first four blocks, and is similarly hinged. The last block in the series is brought around and hinged to the first block along edges 138, in the same manner that the fourth block is hinged to the fifth block, thus completing the ring-form assembly.

As shown in the embodiment of FIGURES 12 through 16, the geometrical solid or block B is an isosceles-triangular right prism. That is, its two parallel faces 180 and 182 (the bases) are congruent isosceles right triangles, with angles of 45°, 45°, and 90°. The three sides, or lateral faces, of the prism are rectangles, two of which (184 and 186) are congruent and are smaller than the third lateral face 187. The proportions of the lateral faces 184, 186, and 187 depend on the altitude of the prism. This altitude is not critical. One convenient altitude is equal to the hypotenuse of the right-triangular base of the prism. Other convenient altitudes are equal to one-half the hypotenuse or twice the hypotenuse.

All B units are directly congruent; i.e., not mirror-images of each other.

A continuous or closed ring arrangement desirably provided by B units includes a multiple of four, not less than eight and preferably sixteen or twenty-four.

The blocks B (FIGS. 12 through 16) will be now described, considering the prism B positioned as in FIGURE 16, that is the prism lying on one of its triangular bases with its largest lateral face toward the observer, and with the edge along the vertical 90° dihedral angle away from the observer. In the drawings, the edges are designated as follows:

Edge 188: at the left side of the largest rectangular face 187—a 45° dihedral angle;

Edge 190: at the top of the largest rectangular face—a 90° dihedral angle;

Edge 192: at the right side of the largest rectangular face—a 45° dihedral angle;

Edge 194: at the bottom of the largest rectangular face—a 90° dihedral angle;

Edge 196: along the left leg of the upper right-triangular prism-base 182—a 90° dihedral angle;

Edge 198: along the right leg of the upper right-triangular prism base—a 90° dihedral angle;

Edge 200: along the 90° dihedral angle formed by the intersection of the two smaller rectangular lateral faces 184 and 186 of the prism;

Edge 202: along the right leg of the lower right-triangular prism-base 180; and

Edge 204: along the left leg of the lower right-triangular prism-base.

One of the desirable hinging patterns for blocks B is according to this pattern: A row of prisms is arranged facing the observer, each being oriented the same way as for the preceding designation of edges. Any block in the row is selected and designated as block $a$, and each succeeding block from left to right in the row is $b$, $c$, $d$, etc. Edge 192 of block $a$ is hingedly attached to edge 188 of block $b$, producing a vertical hinge on a pair of large rectangular lateral faces and on a pair of smaller congruent rectangular lateral faces. Edge 198 of block $b$ is hinged to edge 196 of block $c$, a horizontal hinge in the plane of the upper prism-base, on a congruent pair of isosceles right triangles and a congruent pair of the smaller rectangular lateral faces. Edge 192 of block $c$ is hinged to edge 188 of block $d$, producing a hinge like that which unites blocks $a$ and $b$. Edge 202 of block $d$ is hinged to edge 204 of block $e$, producing a hinge like that between blocks $b$ and $c$, but horizontal in the plane of the lower base instead of in the plane of the upper base. Block $e$ is hinged to block $f$ just as block $a$ is hinged to block $b$; block $f$ to block $g$ as block $b$ to block $c$; and so on, each successive group of four hinges in the series repeating the same pattern of hinging. The row of blocks is made a closed-ended circle or ring of blocks by uniting edge 204 of block $a$ to edge 202 of the last block in the series.

Another illustrative arrangement utilizes blocks B in a quantity which is some multiple of four that is not less than sixteen and is the product of four and an even number. There is a similarity to the arrangement and hinging pattern of the ring of B blocks just described, except that, at two diametrically opposite points in the ring, a pair of hinges like those between blocks $b$ and $c$ and blocks $f$ and $g$ are replaced by a pair of vertical hinges each of which unites the two smaller rectangular lateral faces of one block with the two smaller rectangular lateral faces of the other block.

A further illustrative embodiment of B blocks includes a quantity which is some multiple of four, not less than sixteen, that is the product of four and an even number. The hinging pattern suggested is as follows: With any block designated as block *a* for a starting-point, hingedly attach its edge 202 to edge 198 of the next block to the right in the assembly, this second block being designated as block *b*. Attach each succeeding block in the assembly, moving toward the right, thus: edge 204 of *b* to edge 196 of *c*; edge 202 of *c* to edge 198 of *d*; edge 194 of *d* to edge 190 of *e*; edge 202 of *e* to edge 198 of *f*; edge 204 of *f* to edge 196 of *g*; edge 202 of *g* to edge 198 of *h*. This hinging unites eight blocks, or one-half the total in a 16-block assembly. The eight blocks forming the other half of this same assembly are hinged according to the same pattern of edge-joining. The two halves are united in symmetric relationship by joining the eighth block *h*, to the ninth block *i*, along the edges 188 of these two blocks, the four faces lying on the hinges being a pair of the congruent lateral faces and a pair of the largest lateral faces. The last block, completing the second half of the assembly, is joined to block *a* in the same way that block *h* is joined to block *i*, thus closing the series and forming a ring with bilateral symmetry.

If desired, an assembly containing twenty-four blocks instead of the sixteen just described is made by inserting an additional four blocks on each of the two bisymmetrical sides of the ring. The additional blocks on the first of the two sides may conveniently be inserted between blocks *a* and *b*, being hinged to each other along the same hinging edges as for blocks *b*, *c*, *d*, and *e*, and being hinged to block *a* as *b* is hinged to *a*, and to block *b* as *a* is hinged to *b*. The four blocks added to the other half of the assembly are hinged in the way just described and inserted in a corresponding position.

Another illustrative variation including B blocks illustrated in FIGURES 12 through 14, comprises a ring 208 including triangular prisms B combined with isosceles-triangular plane panels 210 congruent with the triangular bases of prisms B. These panels 210 are shown used in pairs, the two panels in each pair being hingedly connected along one leg of each right triangle to form an isosceles right-triangle with a hypotenuse equal to twice the length of a leg of the base of the prism.

The number of prisms B in the ring 208 is an even number greater than four; the number of plane panels 210 is twice the number of prisms.

In the ring 208 (FIG. 12) the pattern of hinging uniting the plane panels 210 and the prisms B in ring form is effected as follows: Place prisms in a row on a plane surface with their larger lateral faces 187 downward as bases. Rotate the prisms in the horizontal plane so that (starting with any prism arbitrarily designated block *a*) the first prism or block *a* has its edge 190 at right angles to edge 190 of block *b*, and with the vertex between edges 190 and 192 of block *a* in contact with the vertex between edges 190 and 188 of block *b*. Similarly, block *c* is rotated so that its edge 194 is at a right angle to edge 194 of block *b*, with this right angle on the other edge of the row from the right angle between blocks *a* and *b*. Block *d* is rotated with respect to block *c* just as block *b* is with respect to block *a*; and block *e* is rotated with respect to block *d* as block *c* is with respect to block *b*; and so on. Each of the right-triangular spaces left between the corresponding right-triangular faces of each two adjacent blocks is occupied by one of the hinged pairs of right-triangular plane panels 210, the hypotenuse of each of the triangular panels which comprise a pair being hingedly attached to the equal edge of an adjoining block. Thus edges 190 of blocks *a* and *b* are indirectly hinged together by being each hinged to a different hypotenuse of the pair of hinged panels between *a* and *b*; and edges 194 of blocks *b* and *c* are similarly indirectly hinged together by their hinged attachments to the pair of plane, hingedly united panels intervening between them; and edges 190 of blocks *c* and *d* are indirectly hinged together similarly to blocks *a* and *b*; and so on; the blocks at the ends of the row being brought around into the same angular relationship as any other two neighboring blocks, and being similarly hinged to an intervening pair of panels.

Figures 17, 18:
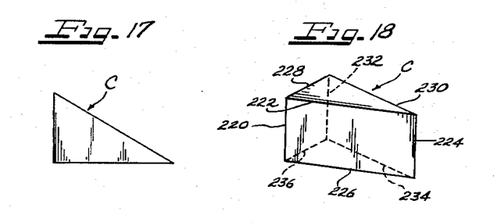
FIGURE 17 is an elevational view of a block unit according to a further modification.
FIGURE 18 is an isometric view of the block of FIGURE 17.
Figure 19:
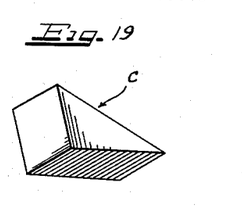
FIGURE 19 is a further isometric view thereof, taken from a different viewing point.
Figures 20, 21:
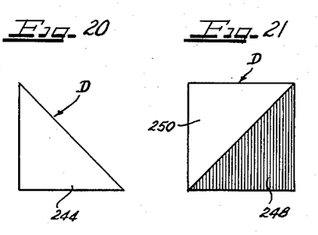
FIGURE 20 is an elevational view of a block unit according to a further modification of the present invention.
FIGURE 21 is a side elevational view of the block of FIGURE 20.
Figure 22:
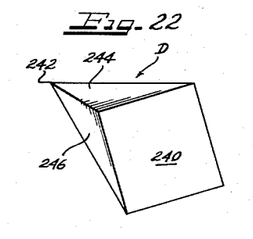
FIGURES 22 and 23 are perspective views of the block unit illustrated in FIGURES 20 and 21.

A further shape is illustrated in FIGURES 17 through 19. There shown is a block unit C, which like block B is a right-triangular right prism, but its bases are shown as scalene right triangles with angles of 30°, 60°, and 90° instead of being isosceles right triangles. It has three rectangular lateral faces, no two of which are congruent. The comparative proportions of these faces depend on the altitude chosen for the prism; this altitude is not critical since it does not affect the combining powers of the unit C, but only the proportions of the composite solids which may be made from an assembly of these units C.

For reference, the edges of unit C are designated as follows, the unit (see FIG. 18) being assumed as resting on that triangular base which will enable the largest rectangular lateral face to be toward the observer, with the 30° dihedral angle (a vertical, lateral edge) at the observer's right, and with the 60° dihedral angle (a vertical, lateral edge) at the observer's left:

Edge 220: 60° dihedral angle, vertical, at left of largest rectangular face and formed by intersection of largest and smallest lateral faces.

Edge 222: 90° dihedral angle, horizontal at top of this largest face, and formed by its intersection with the hypotenuse of the upper base of the prism.

Edge 224: 30° dihedral angle, at right of largest rectangular lateral face, formed by intersection of this face with the lateral face opposite edge 220.

Edge 226: 90° dihedral angle, horizontal, at bottom of largest rectangular face, formed by intersection of this face with hypotenuse of lower base of prism.

Edge 228: 90° dihedral angle, horizontal, on upper base, formed by intersection of smallest lateral face and the shorter leg of the upper base.

Edge 230: 90° dihedral angle, horizontal, on upper base, formed by intersection of that lateral face which is opposite edge 220 with the longer leg of the upper base.

Edge 232: 90° dihedral angle, vertical, opposite the largest lateral face, and formed by the intersection of the smallest lateral face and the lateral face of intermediate size.

Edge 234: 90° dihedral angle, horizontal, on lower base, formed by intersection of longer leg of lower base and the lateral face of intermediate size.

Edge 236: 90° dihedral angle, horizontal, on lower base, formed by intersection of shorter leg of lower base and smallest lateral face.

One illustrative hinging pattern for units C has the same arrangement and pattern of hinging as the first of the arrangements of B units described above.

Another illustrative arrangement utilizing block units C has the same possible number of units as the second B arrangement described above, and has the same pattern of hinging, except as follows: At two diametrically opposite points in the ring, a pair of hinges like those between blocks *b* and *c* and between blocks *f* and *g* are replaced by a pair of vertical hinges each of which unites a congruent pair of the largest lateral faces and a congruent pair of the smallest lateral faces.

A further illustrative arrangement desirably includes sixteen blocks C, connected in a closed-ring arrangement. The hinging is as follows, assuming that all units are resting on a triangular base; and starting with any unit (block) designated as block *a*:

Edge 224 of a block *a* which is inverted (that is, resting on its base bounded by edges 222, 228, and 230) is hinged to edge 220 of the next block *b*, block *b* being erect (that is, resting on its triangular base bounded by edges 226, 234 and 236). This hinge unites the largest and the smallest lateral faces of b with the largest and the intermediate-sized lateral faces of a. Edge 234 of erect block b is hinged to edge 230 of inverted block c, uniting a congruent pair of triangular lower bases and a congruent pair of intermediate-sized lateral faces. Edge 224 of inverted block c is hinged to edge 224 of erect block d, uniting a congruent pair of largest lateral faces and a congruent pair of intermediate-sized lateral faces. Edge 228 of erect block d is hinged to edge 236 of inverted block e, uniting a congruent pair of triangular upper bases and a congruent pair of smallest lateral faces. Edge 224 of inverted block e is hinged to edge 224 of erect block f, uniting a congruent pair of the largest lateral faces and a congruent pair of intermediate-sized lateral faces. Edge 234 of erect block f is hinged to edge 230 of inverted block g, uniting a congruent pair of triangular lower bases and a congruent pair of intermediate-sized lateral faces. Edge 220 of inverted block g is hinged to edge 224 of erect block h, uniting the largest and the smallest lateral faces of g with the largest and the intermediate sized lateral faces of h.

These eight blocks a–h just described form one of two symmetrical halves of this arrangement. The other half consists of blocks i through p, which are inverted or erect like the corresponding blocks in the first half, and are so hinged as to form a mirror-image counterpart of the first half; this requires that any block in the second half be inverted if the corresponding block in the first half is erect, and vice versa. The two halves are united to form a single bisymmetrical ring by these two hinges: edge 230 of erect block h is hinged to edge 234 of inverted block i, uniting a congruent pair of triangular upper bases and a congruent pair of intermediate-sized lateral faces; and edge 230 of erect block p is hinged to edge 234 of inverted block a, uniting a congruent pair of triangular upper bases and a congruent pair of intermediate-sized lateral faces.

A further illustrative shape is the block unit D shown in FIGS. 20 through 23. Unit D is a quadrangular pyramid with a square base 240; its altitude equals the length of a side of the base, and its vertex 242 is perpendicularly above one corner of the base. Two faces 244 and 246 of the pyramid are isosceles right triangles having one leg as their common edge; the other two faces 248 and 250 are scalene right triangles having the hypotenuse as their common edge. Three D units form a cube if put together with their scalene right triangles turned inward and their square bases and isosceles right triangles turned outward.

Figure 23:
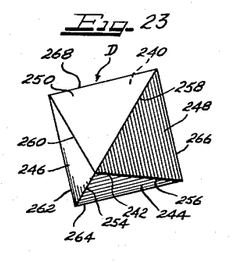
Figure 24:
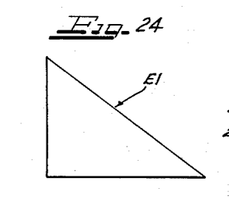
FIGURE 24 is a side elevational view of a block unit according to still another embodiment of the present invention.

The edges of unit D are designated thus, the unit considered as being placed on its square base as in FIGURE 23;

Edge 254 is the vertical lateral edge, a 90° dihedral angle, perpendicular to the base and joining a corner of the base to the vertex 242 of the pyramid.

Edge 256 is an oblique lateral edge, 90° dihedral angle, joining the hypotenuse of the isosceles right triangle 244 which is to the right side of edge 254 to the longer leg of a scalene right triangle 248.

Edge 258, an oblique lateral edge, a 120° dihedral angle, joins the hypotenuse of the scalene right triangle 248 which has edge 256 as one of its legs to the hypotenuse of the other scalene right triangle 250.

Edge 260, an oblique lateral edge, 90° dihedral angle, joins the shorter leg of this second scalene right triangle 250 with the hypotenuse of the isosceles right triangle 246 which is to the left side of edge 254.

Edge 262, a horizontal base edge, 90° dihedral angle, is the base edge at the left of the foot of edge 254.

Edge 264 is like edge 262 but at the right of the foot of edge 254.

Edge 266, a horizontal base edge, a 45° dihedral angle, joins a side of the square base 240 to the shorter leg of the scalene right triangle 248 which has edge 256 as its longer leg. Edge 268, a horizontal base edge, 45° dihedral angle, joins the side of the square base 240 to the shorter leg of the scalene right triangle 250 which has edge 260 as its longer leg.

One desirable hinging arrangement of blocks D is a closed-ring series desirably employing D blocks in a quantity which is the product of six and an even number. In this arrangement the two superposable faces joined on either side of every hinge are a congruent pair. Starting with any block as the first block, a, its edge 268 is hinged to edge 266 of the second block, b, uniting squares and scalene right triangles. Edge 268 of b is hinged to edge 266 of c, also uniting squares and scalene right triangles. Edge 254 of c is hinged to edge 254 of d, on two congruent pairs of isosceles right triangles; d is hinged to e like a to b; and e is hinged to f like b to c. Edge 260 of f is hinged to edge 256 of g on a pair of isosceles right triangles and a pair of scalene right triangles. Next, g is joined to h like a to b; h to i like b to c; i to j like c to d; j to k like a to b; k to l like b to c; and l to the first block a like f to g, thus completing the ring of twelve blocks.

Another suggested arrangement desirable utilizes sixteen of the D-type blocks, and in this arrangement, superposable faces in each of two pairs joined by any hinge are congruent. For effecting this arrangement, the hinging is as follows: First block, a, is hinged to second block b on edge 256 of a and edge 260 of b, joining a pair of isosceles right triangles and a pair of scalene right triangles; edge 264 of b is hinged to edge 262 of c, joining isosceles right triangles and squares; edge 258 of c is hinged to edge 258 of d, joining two pairs of scalene right triangles; edge 254 of d is hinged to edge 254 of e, on two pairs of isosceles right triangles; e to f like c to d; f to g like b to c; and g to h like a to b. This completes one half of the ring.

The other half of the ring comprising eight blocks designated as i through p, is hinged block to block like each of the corresponding blocks a through h. The second half is joined to the first half by the hinging of edge 266 of h to edge 268 of i, uniting a pair of squares and a pair of scalene right triangles. Block p is hinged to the first block, a, like h to i, thus closing and completing the bisymmetrical ring.

FIGURES 24 through 29 shown further shapes. Since the blocks there shown are enantiomorphic or inversely congruent, both forms are designated by the reference letter E, being specifically identified by reference letters E1 and E2.

The unit or block E is an irregular tetrahedron, a triangular pyramid. Two of its four triangular faces are shown as isosceles right triangles with angles of 90°, 45°, and 45°, and congruent with each other; the other two faces are shown as congruent scalene right triangles with angles of 90°, approximately 55°, and approximately 35°. The two forms of E may be obtained from a block D by bisecting a block D with a plane which cuts the square base along a diagonal running from the foot of the vertical edge 254 of D which is a 90° dihedral angle to the opposite corner of the square base 240, and which plane is perpendicular to the base. The half of block D which is at the left of the bisecting plane when block D on its square base is positioned with its 90° vertical dihedral angle toward the observer as in FIGURE 23 is unit E1; the half at the right is E2.

Figure 25:
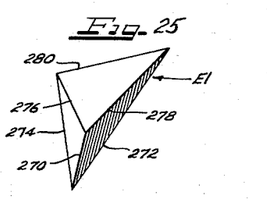
FIGURES 25 and 26 are perspective views of the block of FIGURE 24.
Figure 26:
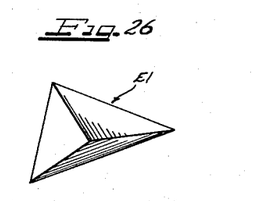
Figure 27:
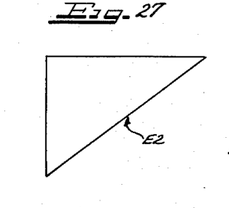
FIGURE 27 is a side elevational view of a block unit which is a mirror image of the block unit shown in FIGURES 24 through 26.
Figure 28:
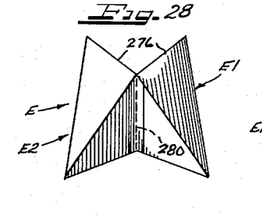
FIGURES 28 and 29 are perspective views showing block units according to FIGURES 24 and 27 hinged together to form a hingedly connected pair of mirror-image block units.
Figure 29:
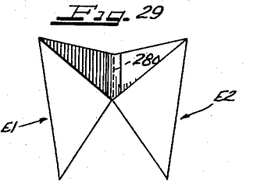

The edges of unit E1 may conveniently be designated as follows (see FIG. 25), a block E1 being placed on one of its isosceles right triangles as a base with a vertical lateral edge which is a 45° dihedral angle and is designated as edge 270 toward the observer;

Edge 272 is the base edge, 90° dihedral angle, adjacent to the foot of edge 270 on the right and forming the hypotenuse of the base of the pyramid;

Edge 274 is the base edge, 90° dihedral angle, adjacent to the foot of edge 270 on the left and forming the lower leg of the lateral face which is an isosceles right triangle;

Edge 276, a 90° dihedral angle, is on the hypotenuse of the lateral face which is an isosceles right triangle;

Edge 278, a 60° dihedral angle, forms the hypotenuse of the two lateral faces which are scalene right triangles;

Edge 280, a base edge, 45° dihedral angle, is on the shorter leg of the scalene right triangle facing away from the observer and on one of the two equal legs of the base.

The edges of unit E2, mirror-image of E1, are numbered like the corresponding edges of E1, and follow the numbering instructions for E1 above, except that edge 272 is adjacent to the foot of edge 270 on the left, and that edge 274 is adjacent to the foot of edge 270 on the right.

As suggestive of the series obtainable with E-type blocks, there will now be described an arrangement in which half the units are E1 units and half are E2 units, with a minimum of twelve, the two enantiomorphic forms alternating, as E1, E2, E1, E2, etc. It will be observed that all pairs of superposable faces hinged together by the same hinge are congruent.

To obtain this arrangement, starting with an E1 unit as the first block, or block a, its edge 280 is hinged to edge 280 of block b (an E2 unit), so that edges 276 intersect, thus uniting two scalene right triangular faces and two isosceles right triangular faces. Edge 270 of block b is hinged to edge 270 of block c (an E1 unit) so that edges 274 intersect, uniting two scalene right triangular faces and two isosceles right triangular faces. Block c is hinged to block d (an E2 unit) like a to b; d is hinged to e (an E1 unit) like b to c; and so on until the ring is completed with closed ends by joining an E2 unit to block a in the same manner that b is joined to c, thus completing the ring.

In a further suggested arrangement, any multiple of four units that is not less than sixteen is employed, arranged in alternating enantiomorphic forms, as E1, E2, E1, E2, etc. Again, all pairs of superposable faces hinged together by the same hinge are congruent.

The hinging for this arrangement is most easily seen with isosceles right triangles of the E units downward as bases: Starting with an E1 unit as block a, its edge 280 is hinged to edge 280 of block b (an E2 unit) so that edges 274 intersect, thus uniting two scalene right triangles and two isosceles right triangles. Edge 272 of b is hinged to edge 272 of block c (an E1 unit) so that edges 278 coincide, uniting two scalene right triangles and two isosceles right triangles. Block c is hinged to d (an E2 unit) like a to b. This completes a group of four hinged blocks. The rest of the assembly is composed of similar groups of four blocks. The groups of four blocks are successively hinged to each other to form a single series thus: Edge 270 of block d is hinged to edge 270 of block e (an E1 unit and the first block in the second group of four blocks) so that edges 274 intersect, thus uniting two isosceles right triangles and two scalene right triangles. The fourth block of the second group of four blocks is hinged to the first block of the third group in this same manner. The fourth block of the last group in the assembly is also hinged in this same manner to the first block in the assembly, block a, thus completing the ring by closing the circle.

It may be here noted that block units of E-type are the shapes which comprise the series shown in Figures 54 through 56.

Figure 30:
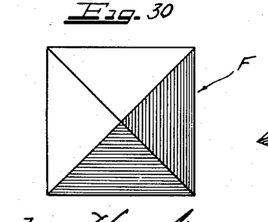
FIGURE 30 is a plan view of a block unit according to still another modification of the present invention.
Figure 31:
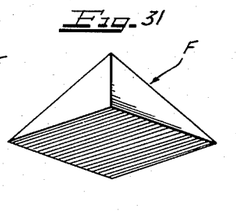
FIGURES 31 and 32, respectively, are an isometric view and an elevational view of the block of FIGURE 30.
Figure 32:
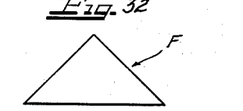

FIGURES 30 through 32 show further suggested shapes for block units, the unit indicated by reference character F. Unit F is a regular square pyramid desirably proportioned so that the altitude equals one-half the length of any side of the base and whose four lateral faces are isosceles triangles. Six of these pyramids having the suggested altitude completely fill a cube if their vertexes are joined at a point which is the center of the cube, so that their square bases become the six faces of the cube.

One desirable arrangement employing F-type blocks illustrates an assembly which is not a ring but an open-ended string of blocks. Desirably, the string has two branching series of blocks at right angles to it. In addition to the solid units F, the string contains a central group of four plane panels desirably like panels 210 of FIG. 12. Each panel is an isosceles right triangle whose base equals a side of the base of pyramid f and whose altitude equals one-half the length of a side of the base of the pyramid. The four panels are hinged together with their apices at the center of a square which they form, this square being congruent with the base of the pyramid.

To obtain this assembly there are used twelve F pyramids in two groups of six each; plus the group of four panels already described hinged together to form a square. These units are hinged as follows, all blocks being considered as resting on their square bases:

A base edge of the first F-unit, block a, is hinged to a base edge of the second block, b, uniting two 45° dihedral angles formed by the intersection on each block of a square and an isosceles right triangle. A base edge of block b which is adjacent to its edge hinged to block a is hinged to a base edge of block c. The other base edge of b which is adjacent to its base edge hinged to a is hinged to a base edge of block d. The opposite base edge of block d is hinged to a base edge of block e. The fourth base edge of block b is hinged to a base edge of block f. This completes one-half of the assembly, this half having the form of a cross with one of its members four squares long and the other member three squares long, block b being at the crossing point and common to both. The six blocks in the other half of the assembly are similarly arranged and hinged.

Continuing the description of the assembly, the two halves are indirectly hinged together in the following manner: The base edge of block f which is opposite to the base edge hinged to block b is hingedly attached to the base of one of the isosceles-right-triangular panels which are themselves hinged together to form a square group of four panels. The base of the isosceles-right-triangular panel which forms the opposite side of the square of four panels is similarly hinged to a corresponding base edge of that block in the second half of the assembly which corresponds to block f in the first half of the assembly. This completes the assembly.

A further suggested arrangement for F-type units is in a closed-ended ring or circle. The number of units is the product of four and an even number, desirably at least sixteen.

In this arrangement, all pairs of faces superposably united by a single hinge are congruent. The hinging is as follows, considering the blocks as having their square bases downward: Starting with any unit F as block a, a base edge of a (a 45° dihedral angle) is hinged to a base edge of b (45° dihedral angle), uniting two squares and two triangular lateral faces. The blocks are then rotated on their bases so that the lateral face of b which is hinged to a faces toward the observer. The right-hand lateral edge (a 120° dihedral angle) of that lateral face of b which is facing away from the observer is hinged to the right-hand lateral edge (120° dihedral angle) of that lateral face of block c which is facing toward the observer, uniting two congruent pairs of triangular lateral faces. The base edge of the lateral face of block c which is facing away from the observer is hinged to a base edge of block d, like a to b. The left-hand lateral edge (a 120° dihedral angle) of that lateral face of block d which is facing away from the observer is hinged to the left-hand lateral edge of that lateral face of block e which is facing toward the observer.

Continuing with this arrangement, block e is hinged to block f like a to b; f to g like b to c; g to h like c to d; and so on, the same hinging pattern being repeated with each successive group of four blocks in the series. The last block of the last group in the series is hinged to block a just as d is hinged to e, forming a closed ring or circle.

Figure 33:
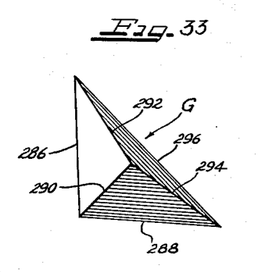
FIGURE 33 is an isometric view of a block unit according to still another embodiment of the present invention.
Figure 34:
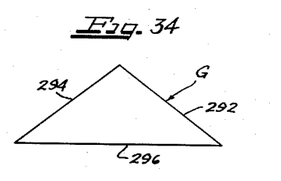
FIGURE 34 is an elevational view thereof.
Figure 35:
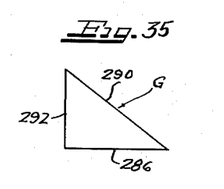
FIGURE 35 is an elevational view thereof, taken from the right side of the view of FIGURE 34.

Block G, which is a further illustrative shape and is shown in FIGS. 33 through 35, is one-half of unit F. A pair of blocks G is derived from a block F by bisecting block F in a plane which is perpendicular to the square base of F and which bisects this square along a diagonal line connecting opposite corners of the square. Twelve units G thus make a cube, it being remembered that six blocks F make a cube.

Unit G is a triangular pyramid whose base is an isosceles right triangle. Two of its lateral faces are congruent isosceles triangles whose bases are the legs of the isosceles-right-triangular base of the pyramid. Each of the base angles of those faces is approximately 55° and their vertex angle is approximately 70°. The base of the third lateral face coincides with the hypotenuse of the pyramid base. The equal base angles of this third lateral face are each approximately 35°, and its vertex angle is approximately 110°. The altitude of the pyramid desirably equals one-half the length of a leg of the isosceles-right-triangular pyramid base. The vertex of the pyramid is perpendicularly above the middle of the hypotenuse of the pyramid base.

The edges of G are designated in FIG. 33 as follows, the pyramid being viewed as resting on its isosceles-right-triangular base with the 90° angle of this base turned toward the observer:

Edge 286, a 45° dihedral angle, is the base edge of the isosceles-triangular lateral face to the observer's left, where this face intersects the base of pyramid on one leg of the base;

Edge 288 is the corresponding edge of the isosceles-triangular lateral face at the observer's right;

Edge 290 is the oblique lateral edge formed by the intersection of the two congruent lateral faces—a 120° dihedral angle;

Edge 292 is the oblique lateral edge at the observer's left, formed by the intersection of the isosceles-triangular face at the observer's left with the incongruent isosceles-triangular lateral face facing away from the observer—a 60° dihedral angle;

Edge 294 corresponds to edge 292, but is at the observer's right side;

Edge 296 is the base of the lateral face facing away from the observer, coinciding with the hypotenuse of the pyramid's base.

A suggested arrangement of G-type blocks comprises a quantity which is the product of three and some multiple of four, being at least twelve units, i.e., 12, 24, or 36 blocks. In forming this arrangement, considering a group of twelve blocks on their isosceles right-triangular bases:

Edge 286 of first unit, a, is hinged to edge 286 of second unit b so that their lateral faces with 110° vertex angles face in opposite directions; this unites a congruent pair of pyramid bases, the latter so rotated that superposition does not make them coincide.

Edge 288 of b is hinged to edge 286 of c, on a congruent pair of lateral faces with 70° vertex angles, and on a congruent pair of bases, so that both pairs can be made to coincide by superposition. Edge 288 of c is hinged to edge 288 of d so that their lateral faces with 110° vertex angles face in opposite directions, uniting a pair of lateral faces with 70° vertex angles and a pair of bases, the latter so rotated that superposition does not make them coincide. These four units a—b—c—d hinged as described form a group which is part of this G series.

The four blocks of the second group are hinged together like the four blocks in the first group. The first unit, e, of the second group is hinged to the last unit d of the first group in the same way that b is hinged to c. The first unit of each succeeding group of four blocks is hinged to the last unit of the last preceding group in this same manner. The last unit in the assembly (unit l—ell—in a 12-unit assembly and unit x in a 24-unit assembly) is brought around and hinged with the first unit a in this same manner, closing the ring and completing the assembly.

Another illustrative arrangement employing G-type units contains an even number of units, the number being desirably at least twelve. The hinging for this arrangement is described with units resting on lateral faces that have angles of 55°, 55°, and 70°. In this arrangement, two faces of either superposable pair joined by any one of the hinges are congruent, and either pair can be made to coincide as hinged. Hinging for the arrangement is as follows:

Edge 286 of first unit, a, is hinged to edge 288 of b, on a pair of pyramid bases and a pair of lateral faces with angles of 55°, 55°, and 70°. Edge 292 of b is hinged to edge 294 of c, on a pair of lateral faces with angles of 110°, 35°, and 35°, and a pair of lateral faces with angles of 55°, 55°, and 70°. Unit c is hinged to unit d like a to b; and d to e like b to c; and so on, the same method of hinging being used for alternate hinges. The last unit in the assembly which is the twelfth unit or one of some larger even number, is brought around and hinged to the first unit, a, in the same manner that b is hinged to c, thus completing the closed-ended circle.

Figure 36:
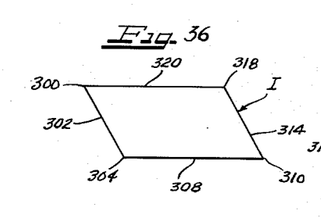
FIGURE 36 is a top plan view of a block unit according to a further modification.
Figure 37:
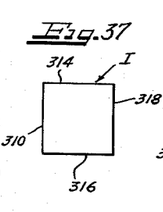
FIGURE 37 is an end elevational view thereof.
Figure 38:
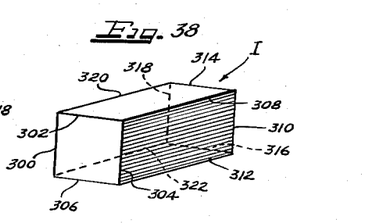
FIGURE 38 is an isometric view thereof.
Figure 39:
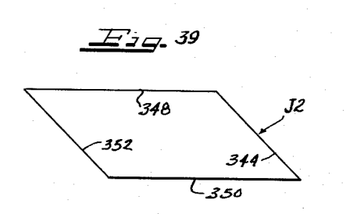
FIGURE 39 is an elevational view of a block unit according to yet another embodiment of the present invention.
Figure 40:
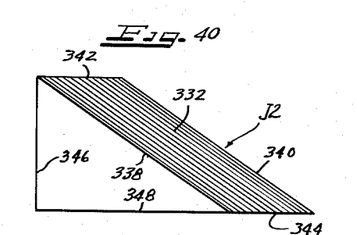
FIGURE 40 is a top plan view thereof.
Figure 41:
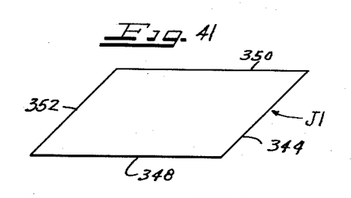
FIGURE 41 is an elevational view of a block unit which is a mirror-image of the block unit illustrated in FIGURE 39.
Figure 42:
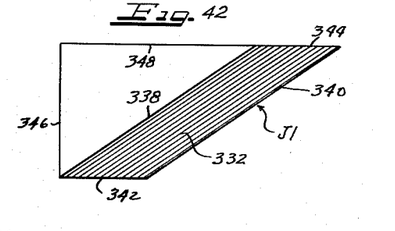
FIGURES 42 and 43, respectively, are a bottom plan view and an isometric view of the block unit shown in FIGURE 41.

A further illustrative shape is block I shown in FIGURES 36 and 38. Block I is a quadrangular right prism of any convenient altitude, with oblique-angled parallelograms as bases. One form of the base may be, as in the assembly next to be described, a rhomboid with angles of 60°, 60°, 120°, and 120°.

The edges of block I are identified in FIGURE 38, wherein the prism I is shown as resting on that base which will permit a base edge to be turned toward the observer so that an obtuse dihedral angle is at the observer's right and an acute dihedral angle at his left. The edge along the acute dihedral angle on the vertical edge at observer's left is identified as edge 300. Edge 302 is along the 90° dihedral angle which is along the upper side of the relatively small face toward the observer. Edge 304 is along the obtuse dihedral angle, a vertical edge opposite edge 300. Edge 306 is along a 90° dihedral angle, along the lower side of that relatively small face, and coincides with one side of the base.

Continuing the description of block I, FIG. 38: Edge 308 is along a 90° dihedral angle along the upper side of the relatively large lateral face which includes edge 304. Edge 310 is along a vertical edge and an acute dihedral angle, opposite edge 304. Edge 312 is along a 90° dihedral angle, and is along the lower side of the lateral face which has edge 308 as its upper side. Edge 314 is along a 90° dihedral angle, along the upper side of the relatively small lateral face away from the observer; and edge 316, also 90° dihedral angle, is the lower side of that same face. Edge 318, a vertical edge and an obtuse dihedral angle, is opposite edge 310 and on that same face. Edge 320 is horizontal, along a 90° dihedral angle, and is the fourth edge of the face having edges 302, 308, and 314; and edge 322 which is also a horizontal edge and a 90° dihedral angle, is the lower side of the same lateral face that has edge 320 as its upper side.

An illustrative hinging arrangement connects blocks I so that two faces in either pair united by a single hinge and superposable are congruent. To form this arrangement, the number of blocks I employed is the product of four and an even number, a total of at least sixteen. All blocks are considered as resting on their bases, but alternate blocks are inverted.

In this arrangement edge 316 of a first I unit (unit a, which is inverted) is hinged to edge 302 of an erect unit b, both these edges being in the upper horizontal plane, thus joining a pair of bases and a pair of faces. Edge 310 of b is hinged to edge 300 of an inverted unit c, thus joining each of two congruent pairs of lateral faces.

Edge 316 of c is hinged to edge 302 of d, thus joining a pair of bases and a pair of lateral faces.

The group of four I units a, b, c, d, thus hinged, is succeeded by other similarly hinged groups of four units, the first unit of each group being hinged to the last unit of the last preceding group thus: Hinge edge 304 of unit e to edge 318 of unit d, e being an inverted block like blocks a and c. To close the ring, bring the fourth unit of the last group of four units in the assembly around to a and hinge it to a just as e is hinged to d, thus completing a closed-ended ring or circle.

FIGURES 39 through 43 show a further illustrative shape, that shape being generally designated J. It is shown as having two enantomorphic forms, respectively identified as J1 and J2.

In the form shown, block J is a five-sided solid or pentahedron which is right-triangular oblique prism, with each base being a scalene right triangle with angles of approximately 35°, 55°, and 90°. The three lateral faces include a rectangle which in the form illustrated is a square 330 having each side equal to the shorter leg of the prism base; secondly, a rhomboid 332 with angles 55°, 125°, 55°, and 125° and with two sides equal to the sides of the square face and two sides equal to the hypotenuse of the prism base; and thirdly a smaller rhomboid 334 with angles of 135°, 45°, 135°, and 45°, with two sides equal to the longer leg of the prism base and two sides equal to the sides of the square face. The smaller rhomboid 334 is perpendicular to either base; the larger rhomboid 332 is tilted 30° from a plane perpendicular to the lower base; and the square face 330 is tilted 45° from a plane perpendicular to either base.

The prism J has two symmetric forms, J1 being that unit (FIG. 43) which, when laid on that base which causes its square face 330 to be tilted obliquely downward, has this square face 330 at the observer's left if the larger rhomboidal face 332 is turned toward the observer; whereas J2 if placed on its corresponding base and in the same position with respect to the observer has its square face at the observer's right.

Figure 43:
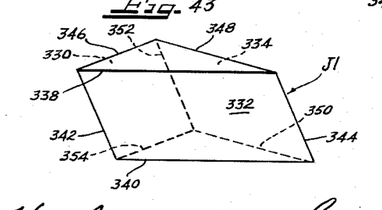

The edges of block J1 are identified as follows, considering the block in the FIG. 43 position just described: Edge 338 is the upper side of the larger rhomboidal face 332 turned toward the observer. Edge 340 is the opposite and lower side of that same face, coincident with the hypotenuse of the lower base. Edge 342 is that short side of the larger rhomboidal face 332 which is coincident with one side of the square face 330. Edge 344 is the short side of the larger rhomboidal face opposite edge 342, and coincides with one of the shorter sides of the smaller rhomboidal face 334. Continuing the description of block J1 (FIG. 43): Edge 346 is the shorter leg of the upper prism-base, and coincides with the upper side of the square face. Edge 348 is the longer leg of the upper prism-base, and coincides with the upper side of the smaller rhomboidal face 334. Edge 350 is the lower side of the smaller rhomboidal face 334, and coincides with the longer leg of the lower prism-base. Edge 352 is that one of the shorter sides of the smaller rhomboidal face opposite to edge 344. Edge 354 is the lower side of the square face, and coincides with the shorter leg of the lower prism-base.

The designation of edges for unit J1 also applies without change to the edges of J2.

Basic J-type shapes may be used in various combinations and arrangements, including both J1 units and J2 units, as for example in an alternating series arrangement.

J-type blocks also illustrate a further concept of my invention, in which block units of non-corresponding shapes but of certain congruencies of their faces may be utilized together in a composite arrangement, for example, a composite arrangement including both J-type blocks and the D-type blocks shown in FIGS. 20 through 23.

In this series, the D units used in combination with J units are of such size as to have their square bases equal to—and congruent with—the square lateral faces of the J-type blocks. The D units also have their scalene-triangular faces congruent with either of the two prism-bases of the J-units. This composite assembly desirably comprises eight D-units, four J1 units, and four J2 units, or double these numbers. It will be seen that both pairs of the two superposable faces united by any single hinge are congruent.

In this series, with the smaller rhomboidal faces 334 of the J units and the isosceles-right-triangular faces 244 of the D-units placed downward as bases, hinging is as follows: The first unit, a, is a J1 unit, and is hinged by its edge 346 to edge 268 of b, a D unit, uniting two squares and two scalene triangles. Edge 254 of b is hinged to edge 254 of c (a D unit), c having its edge 268 upward, so that two congruent pairs of isosceles right triangles are united. Edge 266 of c is hinged to edge 346 of d (a J2 unit), edge 352 of d being downward, so that two squares and two scalene right triangles are united. Edge 340 of d is hinged to edge 340 of e (a J1 unit), edge 352 of e being downward, uniting two larger rhomboidal faces and two scalene triangular faces. Edge 346 of e is hinged to edge 268 of f (a D unit), edge 266 of f being upward, uniting two squares and two scalene right triangles. Unit f is hinged to g (a D unit) like b to c. Unit g is hinged to h (a J2 unit) like c to d. The eight units a through h, thus hinged, are one of the two symmetrical halves of a 16-unit composite assembly of J and D units.

Continuing the description of the assembly, the other eight units, i through p, correspond in their forms and hinging with units in corresponding positions in the first half. The two halves are united by hinging edge 340 of h to edge 340 of i (a J1 unit), both these units having their edges 344 downward, uniting two larger rhomboidal faces and two scalene right triangles. The last unit in the second half, p (a J2 unit) is brought around to unit a and is hinged to a as h is hinged to i, thus completing the closed-ended ring or circle.

Besides the assembly just described, numerous other composite arrangements are geometrically equally feasible, such arrangements hingedly combining a plurality of two or more dissimilar types of geometrical solids, such solids having certain of their faces congruent with one another or having one face or the sum of two or more juxtaposed faces of one such type of solid congruent with the sum of two or more juxtaposed faces of other solids of one or more distinct types.

Figure 44:
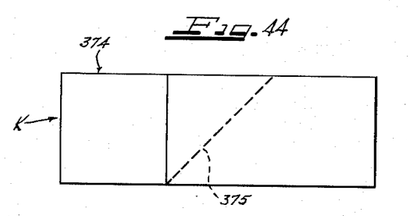
FIGURES 44 and 45, respectively, are plan and elevational views of a block, with a broken line indicating the manner of cutting the block so as to produce a mirror-image pair of block units according to another embodiment of the invention.
Figure 45:
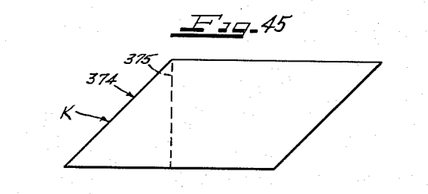
Figure 46:
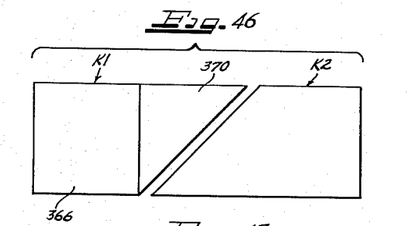
FIGURES 46 and 47, respectively, are plan and elevational views following FIGURES 44 and 45, the indicated cut already having been made and the block units so formed being shown as slightly spaced to indicate the separation.
Figure 47:
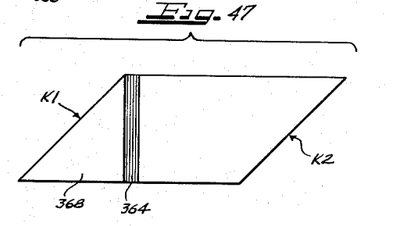

A further illustrative block shape is hexahedron herein referred to as block K (FIGS. 44 and 45). In the form illustrated, the hexahedron K may be seen to be a compound of two congruent isosceles-right-triangular right prisms whose altitude equals either leg of the base and which are rotated 90° with respect to each other so that one of the square lateral faces of one prism assumes the position of the prism's base, and its other square lateral face can be joined to a square lateral face of the second prism, this second prism remaining erect upon a triangular base.

Figure 48:
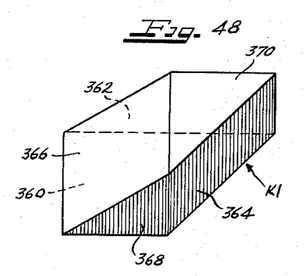
FIGURE 48 is an isometric view of the block unit shown as the left-hand block unit of FIGURES 46 and 47.
Figure 49:
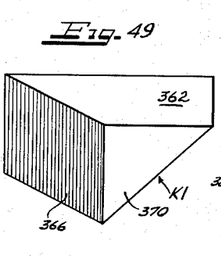
FIGURES 49 and 50 are further isometric views thereof, taken from different viewing points.

The solid block K thus described in terms of its component solids has these faces (FIG. 48): a trapezoidal base 360 with two right angles, an obtuse angle, and an acute angle; a trapezoidal face 362, perpendicular to and congruent with the base; a rectangular face 364 perpendicular to the base; a rectangular face 366 congruent with this face, but sloping obliquely upward from the base; an isosceles-right-triangular face 368, perpendicular to the base; a horizontal isosceles-right-triangular upper face 370, congruent with the triangular lateral face 368.

The solid generally referred to herein as a K-type shape has two inversely congruent or symmetrical forms, herein distinguished as unit K1 and unit K2. Unit K1 is that form of the solid which, when placed as in FIG. 50 with either trapezoidal face downward as base, and with its other trapezoid turned toward the observer, has a rectangular face sloping downward to intersect the base at the right. Unit K2 is that form which under the same conditions has a rectangular face sloping downward to intersect the base at the left.

FIGS. 44 through 47 illustrate the shapes K1 and K2, and illustrate a manner of obtaining a K1 and K2 pair, by cutting a block 374 along a plane indicated by the broken line 375.

The edges of shape K are identified in the drawings as follows, either K1 or K2 being considered in the position relative to the observer just described (FIG. 50): Edge 376 is the horizontal upper side of the trapezoid 360 facing toward the observer, and is coincident with a leg of the right-triangular upper face 368; Edge 378 is the sloping side of the trapezoidal face, coincident with a long side of the sloping rectangular face; Edge 380 is the longest side of the trapezoidal face facing the observer, coincident with the longest side of the base of the solid; Edge 382—the shortest side of the trapezoidal face, included between the two 90° angles.

Figure 50:
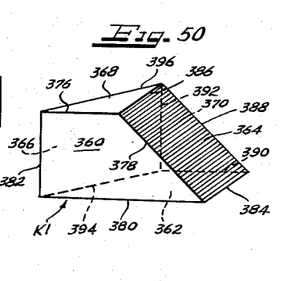

Continuing the description of block K, the edge 384 is the base edge of the sloping rectangular face 364, coincident with that side of the trapezoidal base included between its two 90° angles; edge 386 is the upper, horizontal short side of the sloping rectangular face, opposite edge 384 of the same face; edge 388 is the more distant sloping side of the sloping rectangular face, opposite edge 378 and coincident with the hypotenuse of the right-triangular face 370 turned away from the observer; edge 390 is the horizontal leg of the right-triangular face turned away from the observer, coincident with that side of the trapezoidal base 362 which is included between a right angle and an obtuse angle; edge 392 is the leg, perpendicular to the trapezoidal base, of the right-triangular face turned away from the observer, coincident with a short side of the rectangular face 366 which is perpendicular to the base; edge 394 is the lower horizontal side of that same rectangular face, coincident with the side of the trapezoidal base included between acute and obtuse angles; and edge 396 is the hypotenuse of the triangular upper face 368 of the solid, coincident with the upper side of the rectangular face perpendicular to the base of the solid.

In forming a series of K-type units, it is desirable to employ a quantity which is the product of four and some even number, but at least a total of sixteen. Desirably the units K1 and K2 alternate throughout the assembly.

In a desirable arrangement of K-type units, the faces in either pair of superposable faces united by any hinge are congruent. With units downward on trapezoids as bases, edge 382 of unit *a* (a K1 unit) is hinged to edge 382 of *b* (a K2 unit), both units having their edges 376 upward, uniting two trapezoids and two rectangles. Edge 384 of *b* is hinged to edge 834 of *c* (a K1 unit), both units having their edges 376 upward, uniting faces congruent with those hinged by the first hinge, but perpendicular to them. C is hinged to *d* (a K2 unit) like *a* to *b*. The four units *a* through *d*, thus hinged, comprise a group which is one-fourth of this K assembly when the assembly contains a total of sixteen units. Each unit in each other group of four units is hinged like the corresponding unit in the first group. The first unit, *e*, of the second group, a K1 unit, has its edge 390 hinged to the edge 390 of unit *d* (last unit in the first group), joining a pair of trapezoidal bases and a pair of isosceles right triangles. The first unit of the third group is similarly hinged to the last unit of the second group; and so on. The last unit of the last group is also hinged in this same way to unit *a*, completing this K assembly by making it a closed-ended ring or circle.

Figure 51:
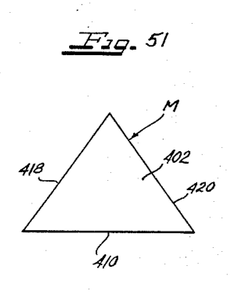
FIGURE 51 is a top plan view of a block unit according to another embodiment of the present invention.
Figure 52:
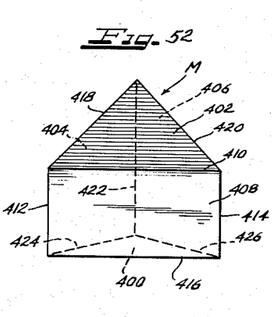
FIGURE 52 is an isometric view of the block shown in FIGURE 51.
Figure 53:
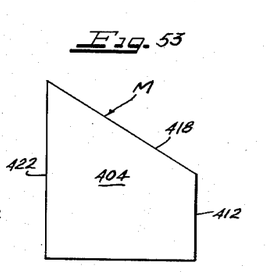
FIGURE 53 is a side elevational view thereof.

Another illustrative shape M is illustrated in FIGS. 51 through 53, shape M being an irregular five-sided solid which is a truncated isosceles-triangular-right prism. In the form shown, the base 400 thereof has base angles of 54°, 72°, and 54°. The altitude of the prism is shown equal to the longest side of the triangular base. The prism is truncated at its upper base by a plane which slopes obliquely downward from the 72° dihedral angle of the upper base and intersects the two vertical edges which have 54° dihedral angles, at points midway between the upper and lower bases of the prism. The face 402 created by this oblique bisecting plane is an equilateral triangle whose sides are each equal to the longest side of the base. Besides this equilateral-triangular face and the lower base of the prism, the other faces are a lateral congruent pair of trapezoids 404 and 406, each having angles of 90°, 90°, 60°, and 120°, and a lateral rectangle 408 with its two longer edges each equal to the longest side of the prism-base and with its two shorter edges each equal to one-half the altitude of the prism.

In the drawings, the edges of the unit M are designated as follows, the truncated prism being considered in the position shown in FIG. 52, that is, resting on its isosceles-triangular base 400 with its rectangular lateral face 408 turned toward the observer; edge 410 is the upper side of the rectangular lateral face, coincident with the lower side of the sloping, equilateral-triangular face 402; edge 412 is that short side of the rectangular face 408 which side is at the observer's left, is perpendicular to the base, and is coincident with the shortest side of the left-hand trapezoidal face 404; edge 414 corresponds to edge 412 but is at the observer's right; edge 416 is the horizontal lower side of the rectangular lateral face, coincident with the longest side of the base of the solid.

Continuing the description of shape M (FIG. 52), the edge 418 is the side of the equilateral-triangular face which is at the observer's left, coincident with the sloping side of the trapezoidal face 404 at the observer's left; edge 420 is the side corresponding to edge 418, but at the observer's right; edge 422 is the edge, perpendicular to the base, which is opposite to the face 408 turned toward the observer, and is formed by the intersection of the trapezoidal lateral faces; edge 424 is the horizontal base of the trapezoidal face at the observer's left, coincident with one of the two equal sides of the prism-base 400; and edge 426 is the horizontal base corresponding to edge 424, but at the observer's right.

An illustrative arrangement of M units employs a quantity which is the product of four and some even number greater than two, preferably a series of sixteen blocks. It will be noted that the faces of each block pair which are superposably united by one hinge are congruent.

According to this M arrangement, edge 426 of block *a* (the first unit) is hinged to edge 424 of block *b*, both units having their edges 422 downward, uniting two isosceles triangles and two trapezoids. Edge 418 of block *b* is hinged to edge 420 of block *c* (block *c* also having its edge 422 downward, like all units in the assembly), uniting two equilateral triangles and two trapezoids; *c* is hinged to *d* like *a* to *b*. This completes the hinging of the first group of four units.

Continuing the description of this M series, the units in each succeeding group of four units in the assembly are hinged like the corresponding units in the first group. The last unit in each group is hinged to the first unit of the next succeeding group in the series thus: Hinge edge 420 of *d* to edge 418 of *e* (the first unit in the second group), uniting two equilateral triangles and two trapezoids. The last unit in the last group in the assembly is brought around to the first unit in the assembly, *a*; this last unit is joined to *a* as *d* is joined to *e*, completing the closed-ended ring or circle.

The series shown in FIGURES 54 through 56 comprises blocks according to E-shape, and illustrates the concept of transparent blocks each carrying fragmental portions of a composite design, picture, or other indicia, those portions being so dispersed on the surfaces of the several blocks that when the blocks are manipulated to form certain composite geometrical solids, the fragments will visually integrate to provide composite designs, pictures, or other combinations of indicia whose parts when properly assembled occupy various positions in three-dimensional space on the exterior and interior faces of the component geometrical solids, thus providing effects similar to those of dioramas and stereoscopic representations.

It will be understood that modifications and variations may be effected without departing from the scope of the novel concepts of the present invention.

I claim as my invention:

1. A continuous closed-ring series of polyhedra the number of which is in excess of four, each polyhedron being flexibly joined to each of two adjacent polyhedra in the series by means of a hinge uniting two adjacent congruent dihedral angle edges of the polyhedra in a manner to enable swinging of the united polyhedra about the respective hinges into face-to-face relation, a plurality of the several pairs of hinged edges in the series as a whole occupying segments of nonparallel lines such that the selective rotation of individual polyhedra in suitable directions and in suitable amounts about their hinging axes effects a wide range of motions of the polyhedra relative to one another and permits certain selected faces of certain polyhedra to be superposed on any of certain faces of a plurality of other polyhedra in the series.

2. A polymorphic, composite, three-dimensional geometrical figure whose component parts are in a closed-ring series of blocks the number of which is at least four which have certain plane faces lying on planes a plurality of which are nonparallel with respect to each other, each of the said component blocks being made part of a single articulated series by being hinged along at least one of its edges to an edge of at least one adjacent component block in the composite figure, each of a plurality of the said hinges which unite adjacent component blocks being nonparallel with respect to certain other hinges, and each of a plurality of which hinges uniting two adjacent component blocks lies along edges which are equal dihedral angles, each of these two hingedly united dihedral angles being formed by the intersection of two plane faces each of which faces is incongruent with the other face which it intersects but is congruent with that one of the two intersecting faces of the other block on which it may be coincidingly superposed by rotation of the two adjacent blocks around the axis of rotation afforded by their common hinge.

3. A polymorphic geometrical device comprising a closed-ring series of blocks the number of which is at least four, the intersecting faces on each block coming together at respective dihedral angle edges, hinge means connecting contiguous of said angle edges of adjacent blocks in the series in a manner enabling swinging of the connected blocks to place the faces of the blocks at each side of each hinge in face-to-face abutment, the connected edges being alternately located on relative angular rotational axes, and the blocks beyond each pair of blocks in the series being swingable into face-to-face engagement with the adjoining block of the pair and also being swingable into a plurality of selective face-to-face engagements with respect to each other by manipulative swinging of the blocks about the hinges to form any of a plurality of predetermined geometrical formations in which all of the blocks combine.

4. A polymorphic geometrical device comprising a closed-ring series of at least four blocks, each block having a plurality of faces, at least one face of each block being incongruent relative to a plurality of the remaining faces on such block, the intersecting faces on each block coming together at respective dihedral angle edges, the blocks being disposed in the series with congruent dihedral angle edges thereof adjoining, hinge means connecting said adjoining edges and enabling swinging of the blocks connected thereby in each instance completely to both sides of the hinge for face-to-face abutment of the respective opposing faces of the blocks, and the alternate adjoining edges throughout the series extending on different axes of rotation according to a pattern so that the blocks beyond each connected pair of the blocks in the series can be variously manipulated to bring any of a plurality of faces of each of said blocks beyond selectively into face-to-face engagement with different faces of the other blocks in the series for the formation of any selected one of a plurality of predetermined configurations in which all of the blocks cooperate.

5. A polymorphic geometrical device comprising a plurality of blocks separated by a plurality of plane geometrical panels all disposed in predetermined series relationship and all having a plurality of dihedral angle edges, hinge means connecting contiguous of said angle edges of the blocks and panels which are adjacent in the series in a manner enabling swinging of the faces of the blocks and panels at the respective opposite sides of the hinges into face-to-face abutment, the connected edges being alternately located on relative angular rotational axes, and the blocks and panels being rotatorially manipulable about said angular rotational axes into a plurality of selective face-to-face engagements with respect to each other to afford a plurality of predetermined formations in which all of the blocks and panels combine.

6. A polymorphic geometrical device comprising a closed-ring series of at least four blocks, said blocks having at least two incongruent faces and at least two obliquely disposed dihedral angle edges which are respectively congruent with corresponding angle edges of the adjoining blocks, hinge means connecting said congruent angle edges of the blocks and thus enabling the connected blocks to be swung about the hinges into respective face-to-face relation on each side of each hinge, and the blocks beyond each pair of blocks in the series being swingable into face-to-face engagement with the adjoining block of the pair and also being swingable into a plurality of selective face-to-face engagements with respect to each other by manipulative swinging of the blocks about the hinge axes of said angle edges to form any of a plurality of predetermined formations in which all of the blocks combine.

7. A polymorphic geometrical device comprising a closed-ring series of polyhedra the number of which is at least four, said polyhedra having dihedral edges adjoining one another in the series and lying along skew lines with respect to each other alternately in the series, and hinge means connecting said adjoining edges and enabling swinging of each pair of connected blocks into face-to-face engagement on each side of the connecting hinge and also enabling rotatorial manipulation of the entire series about the series axis and swinging of the blocks of the series about the hinge axes to move them into a plurality of selective face-to-face engagements with respect to each other to form any of a plurality of predetermined geometrical formations in which all of the blocks combine.

8. A polymorphic geometrical device comprising a closed-ring series of blocks which comprises the product of four and an even number, said blocks having intersecting faces coming together at respective dihedral angle edges, each of said blocks having one of its dihedral angle edges adjoining each contiguous block in the series, said adjoining edges being disposed alternately angular to one another in the series, the hinged edges of the contiguous blocks being equal dihedral angles and each formed by the intersection of two faces each of which faces is incongruent relative to the other intersecting face on the same block but is congruent relative to the corresponding face of the connected contiguous block on which it may be coincidingly superposed by swinging of the contiguous blocks relative to each other about the axis of rotation afforded by their common hinge, and the blocks beyond each pair of contiguous blocks in the series being swingable into face-to-face engagement with the adjoining block of the pair and also being swingable into a plurality of selective face-to-face engagements with respect to others of the blocks in the series by manipulative swinging of the blocks about the hinges whereby to form any of a plurality of predetermined geometrical formations in which all of the blocks combine.

9. A polymorphic geometrical device comprising at least four blocks disposed in series, said blocks being disposed by congruent pairs each having a shape such as may be derived from the bisection of a prism by a plane which is perpendicular to either of two diagonal lines joining opposite corners of a quadrangular lateral face of that prism, each of the congruent blocks of each pair having a plurality of faces which are incongruent with respect to each other but each of which faces is congruent with any of a plurality of those faces of certain of the other blocks in the series on which said faces can be coincidingly superposed through selective manipulation of the blocks, said faces of the blocks intersecting on dihedral angle edges, said blocks having congruent ones of said edges adjoining the respective pairs in the series, and hinge means connecting said adjoining edges and enabling swinging of the connected blocks about the hinge axes, said hinge axes being disposed alternately angular to one another in the series, whereby to enable selective manipulation of the blocks by swinging thereof on said angular axes to bring various faces of the blocks into any of a selected plurality of face-to-face engagements with other blocks in the series to form any of a plurality of predetermined geometrical formations in which all of the blocks combine.

References Cited in the file of this patent

UNITED STATES PATENTS

| | | |
|---|---|---|
| 191,167 | Mueller | May 22, 1877 |
| 270,225 | Kennedy | June 9, 1883 |
| 538,261 | Kennedy | Apr. 30, 1895 |
| 595,782 | Morsell | Dec. 21, 1897 |
| 1,292,188 | Wheeler | Jan. 21, 1919 |
| 1,471,943 | Chambers | Oct. 23, 1923 |
| 1,973,564 | Graham | Sept. 11, 1934 |
| 2,216,915 | Johnson | Oct. 8, 1940 |
| 2,839,841 | Berry | June 24, 1958 |